Aug. 29, 1967     J. C. HURLBURT     3,338,036
HAY HARVESTING MACHINE
Filed Jan. 26, 1965
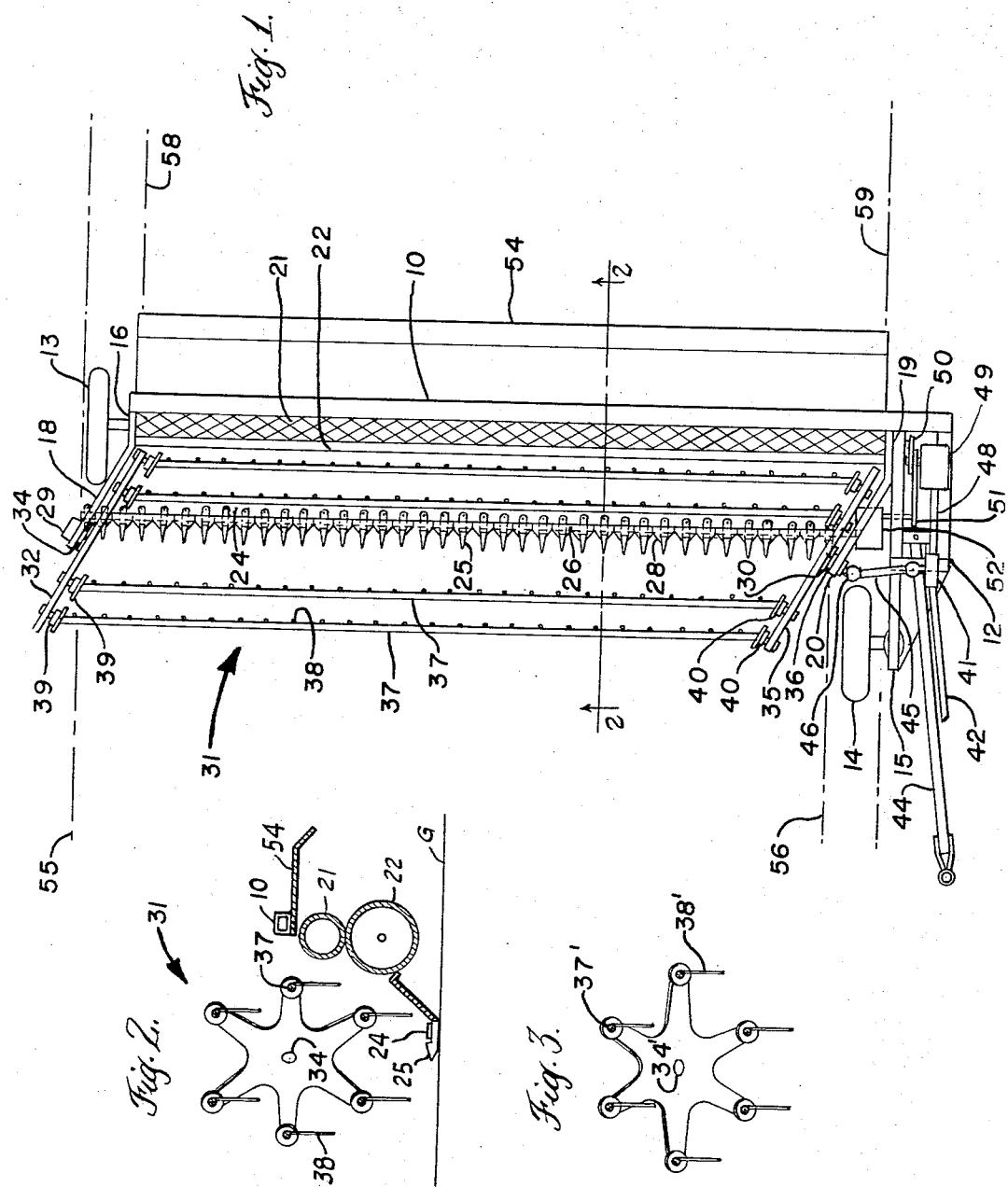
INVENTOR.
JOSEPH C. HURLBURT
BY *Walter V. Wright*
AGENT United States Patent Office 3,338,036
Patented Aug. 29, 1967

3,338,036
HAY HARVESTING MACHINE
Joseph C. Hurlburt, Leola, Pa., assignor to Sperry Rand Corporation, New Holland, Pa., a corporation of Delaware
Filed Jan. 26, 1965, Ser. No. 428,092
7 Claims. (Cl. 56—23)

This invention relates to hay harvesting equipment.

The first step in harvesting a crop of hay is to mow the crop. Reciprocating mowers are well known and widely used. They have a fixed cutterbar which supports a reciprocating sickle bar. The fixed cutterbar carries a number of pointed, forwardly extending, fixed knife guard members. The sickle bar carries a number of knives which reciprocate with the sickle bar, past the fixed knife guards to cut the crop. These mowers can become plugged if they are moved forwardly into the crop material at too fast a ground speed for the density of the crop. The capacity of the mowers to resist plugging, and hence the operating ground speed, can be greatly increased by the use of a reel in combination with the sickle bar. The reel is mounted above the sickle bar and has members which rake the crop material rearwardly over the sickle bar.

A source of annoyance and potential plugging in reciprocating mowers, with or without a coacting reel, is that crop stalks sometime drape around the forward edges of the fixed guards and extend rearwardly along the sides of the guards. The reel, which moves rearwardly parallel to the guards, may comb through, or over these stalks without dislodging them. These stalks then snag other stalks and hinder the passage of the crop, in general, rearwardly over the sickle bar.

One object of this invention is to provide a mower and reel arrangement which more effectively prevents snagging or "hairpinning" of crop stalks over the guards of a mower, thereby increasing its capacity, reducing the likelihood of plugging, and enabling operation at higher ground speeds.

A mower sickle bar should operate close to the ground, yet remain off the ground. This is accomplished by the provision of ground engaging support, or gauge, members at the ends of the sickle bar. These are commonly runners or wheels which engage the ground and hold the sickle bar at the proper distance above the ground. Usually the mower driving head is supported on one of these runners or gauge members. Crop material sometimes builds up on the gauge members or driving head until the operator must stop and clear it away.

Another object of this invention is to eliminate the problem of crop build-up on the sickle bar gauging members or driving head.

Another step in the harvesting operation is known as crop conditioning. This consists of passing the mowed crop between a pair of coacting rolls which crack or crush the stems of the stalks to facilitate the escape of moisture and reduce drying time. The best time to condition the crop is immediately upon mowing before any wilting occurs. After conditioning, the crop is deposited back on the ground to dry in preparation for subsequent harvesting operations. Optimum conditioning is achieved by the use of conditioning rolls which are as long as the width of the mowed swath of crop material. The crop material can then pass between the rolls in a thin layer for maximum stem cracking. Machines known as windrowers or swathers mow a wide swath of crop material, then consolidate the swath into a relatively narrow thick mat, and then pass the mat rearwardly between short conditioning rolls. This provides conditioning immediately upon mowing; but with less effective stem cracking than could be accomplished by the use of long rolls operating on the full width of the swath in its natural thin layer form. The narrow thick form of the mass of conditioned hay deposited back on the ground by a windrower also requires a longer drying time than a wide thin layer of the same hay.

Full swath width conditioning rolls have generally been used only on conditioning implements which do not mow the crop. The use of full swath width conditioning rolls on machines which both mow and condition a crop in one operation is accompanied by certain conditions or problems which detract from this highly desirable combination. Generally speaking, these problems are related to the location of the implement ground wheels. If the wheels are placed at the sides of the machine, when a given swath is being mowed one wheel will be running over the standing crop material of the next succeeding swath, while the other wheel will be running over the previously conditioned swath. On the other hand, if the wheels are located behind the mower and rolls, they will run over the swath being conditioned unless portions of the swath are deflected around the wheels. Deflection of a portion of the swath, however, causes it to lie on top of another part of the swath. This double thick portion of the swath will not dry at the same rate as the normal single thickness portion of the swath, thereby reducing the uniformity of the hay quality. Location of the wheels behind the conditioning rolls also places them too far behind the sickle bar for optimum sickle bar gauging, and optimum maneuverability of the implement.

It is another object of this invention to provide a combined mowing and conditioning implement having full swath-width conditioning rolls.

It is another object of this invention to provide a combined mowing and conditioning implement which deposits back on the ground a conditioned swath of crop material the full width of the sickle bar.

It is another object of this invention to provide a combined mowing and conditioning implement wherein no portion of the mowed swath is piled on top of another portion either before or after conditioning, thereby insuring uniform fast drying of the crop.

It is another object of this invention to provide a combined mowing and conditioning implement with superior mower gauging characteristics and maneuverability.

It is another object of this invention to provide a combined mowing and conditioning implement wherein the implement wheels neither run over the swath being conditioned, the previously conditioned swath, nor the standing crop of the next succeeding swath.

It is another object of this invention to provide a combined mowing and conditioning implement which laterally displaces the entire swath being harvested thereby providing adjacent the next succeeding swath a clear strip of ground upon which wheels of the towing vehicle may run to gauge the harvesting of the next swath.

These and other objects and advantages of this invention will be apparent upon reference to the following description and claims taken in conjunction with the accompanying drawings wherein:

FIG. 1 is a plan view of a combined mowing and conditioning implement constructed in accordance with the principles of the present invention;

FIG. 2 shows a semi-diagrammatic cross section view of the implement in FIG. 1 as taken generally on the line 2—2 thereof; and FIG. 3 is a cross sectional view similar to FIG. 2 showing another embodiment of the reel.

Referring to the drawings in detail, the reference numeral 10 indicates a transversely extending main implement frame member. A box frame structure 12 extends forwardly from main frame member 10 at the left side of the machine relative to the direction of travel which is normally from right to left as shown in FIG. 1. A ground engaging wheel 13 is provided at the right side of the implement frame. A similar ground wheel 14 is journalled on a gusset structure 15 extending forwardly from box frame 12 at the left side of the implement. The right ground wheel 13 is journalled on main frame side plate 16 which has a forward portion 18 extending outwardly at an angle in front of the wheel. At the left side of the machine a similar frame side plate 19 has a forward angularly disposed portion 20 parallel to the right side plate portion 18. The plate portions 18 and 20 need not be fixedly formed with plate portions 16 and 19.

Conventional upper and lower conditioning rolls 21 and 22 extend transversely between the implement side frame members 16 and 19 and are journalled thereon. Forwardly of conditioning rolls 21 and 22 and disposed adjacent the ground is a transversely extending mower cutterbar 24. The ends of cutterbar 24 are respectively carried by portions 18 and 20 of frame side plates 16 and 19. A plurality of conventional forwardly extending pointed knife guards 25 are fixedly carried by cutterbar 24. A conventional reciprocable sickle bar 26, having the usual knife members 28, is mounted atop cutterbar 24 for reciprocation relative thereto.

It will be apparent in FIG. 1 that the mower cutterbar and sickle bar extend transversely in front of right ground wheel 13 immediately in front of the wheel. It will also be apparent in FIG. 1 that the conditioner rolls 21 and 22 are of the same length as sickle bar 26, although offset laterally to the left relative to the sickle bar by the distance necessary to accommodate right ground wheel 13.

A journal 29 is carried by portion 18 of the right side frame plate 16 generally above the right end of mower sickle bar 26. A similar journal 30 is provided at the left side of the machine on angular portion 20 of left frame side plate 19. A reel structure is shown and indicated generally by the reference numeral 31.

Reel 31 has a right end member, or spider, 32 which has a central stub shaft 34 journalled in journal 29. A similar spider 35 is provided at the left end of reel 31 and has a central shaft 36 journalled in and extending through left reel journal 30. It will be apparent in FIG. 1 that the axes of rotation of spiders 32 and 35 are parallel to each other and extend at angles between parallel and perpendicular to sickle bar 26 and conditioning rollers 21 and 22. A plurality of bars 37 extend between spiders 32 and 35. As may be seen in FIG. 2, there are preferably six such bars in all, although only four are shown in FIG. 1 in order that the mower sickle bar and related parts may be more readily seen. The exact number of bars employed is not critical. Each of the bars 37 carry rake-type tines 38. The right ends of each of the bars 37 are carried by journals 39 on the right reel end spider 32. Similar journals 40 mount the left ends of the bars 37 on left reel spider 35.

A particular manner of driving the conditioning rolls, the sickle bar and the reel is not considered to be a part of the present invention. Many conventional drive arrangements for the separate elements of this implement will be readily envisionable to those skilled in the farm machinery art. Merely as an example, FIG. 1 shows a first gearbox 41 having a forwardly extending power input shaft 42 which connects to the power-take-off means of a tractor towing the implement via drawbar 44. Drawbar 44 extends forwardly from box frame structure 12. The first gearbox 41 has a laterally extending output shaft 45 which is connected by a universal coupling 46 to the shaft 36 of left reel spider 35. A second output shaft 48 extends rearwardly from gearbox 41 to a main gearbox 49. A conventional chain and sprocket drive indicated by the reference numeral 50 may be provided from gearbox 49 to the conditioning rolls 21 and 22 as is common practice in the art of hay conditioning implements. A similar driving connection 51 may be provided from gearbox 49 to a conventional mower driving head 52 supported on plate frame member 20 at the left end of sickle bar 26.

The present invention involves a novel arrangement and combination of sickle bar, conditioning rolls, reel and ground wheels. The direction of rotation of reel 31 is counterclockwise as the reel appears in FIG. 2. In FIG. 1, the reel bars 37 move downwardly into crop material in front of sickle bar 26 and then rake simultaneously laterally and rearwardly over the sickle bar. The lateral movement of the tines 38 over the sickle bar, as opposed to the straight rearward relative movement of conventional reels, opposes hairpinning of the crop over the knife guards 25 by moving the crop diagonally past the guards instead of parallel to the guards. The positioning of the right gauge wheel 13 immediately behind sickle bar 26 provides excellent sickle bar gauging characteristics while the frame plate 18 and laterally moving reel prevent crop material from becoming entangled on wheel 13 or its shaft. At the completion of their lateral and rearward movement, the reel raking members move upwardly and deliver the crop material into the receiving bite of the conditioning rolls 21 and 22. The rolls carry the crop material rearwardly therebetween cracking the stems of the individual stalks in the process. The conditioned crop material is ejected from rolls 21 and 22 upwardly and rearwardly under a crop deflecting shield 54 which is carried by frame member 10. The shield 54 deflects upwardly ejected crop material back down onto the ground to dry as is customary in the hay conditioning art. The length of conditioning rolls 21 and 22 is the same as the length of sickle bar 26. In FIG. 1 it may be seen that the swath cut by sickle bar 26 lies between broken lines 55 and 56 while the same full width swath is deposited back on the ground in the area between broken lines 58 and 59. Thus, the entire swath has been laterally displaced by the lateral distance between lines 55 and 58, thereby providing a clear strip of ground upon which wheel 13 runs, and along which wheels of the towing vehicle and the mower driving head 52 may travel upon harvesting of the next succeeding swath. Thus, fewer wheels of the towing vehicle and no wheels of the implement itself actually pass over the conditioned swath as occurs with conventional arrangements. This is accomplished without deflecting or double layering, any portion of the swath on top of another portion.

As may be seen in FIG. 2 the end profile of the reel is not circular but elliptical as a result of the angled axes of rotation of the reel spiders. As a result of this geometry, the conditioning rolls 21 and 22 may be located forwardly closer to sickle bar 26 than in the case of conventional reel arrangements. This facilitates a reduction of the overall machine size and a lessening of framing requirements, thereby increasing maneuverability and reducing the cost of the machine. As a result of the short travel of the crop and the positive feeding of the reel from in front of the cutterbar 26 into gripping relation with the bite of the conditioning rolls, there is little chance of crop build-up and plugging in front of the conditioning rolls.

The FIG. 3 embodiment is merely an alternate orientation of the axes of rotation of the reel spiders. Elements common to the embodiment of FIGS. 1 and 2 bear the same, but primed, reference numerals. In FIGS. 1 and 2 axes of rotation of spider shafts 34 and 36 lie in a common horizontal plane. The same type of reel could be employed with the axes of shafts 34 and 36 lying in a vertical plane transverse to the direction of travel. This can best be visualized if one imagines bending the reel mounting plates 18 and 20 so that they extend in the direction of travel of the machine and lie in vertical planes; and then tilting the plates 18 and 20 so that they can lean to the left. The respective axes of rotation of the reel spiders would then lie in a common vertical plane transverse to the direction of implement travel and each axis would point downwardly into the ground on the left side of its respective spider and upwardly into the air at an angle on the right side of its respective spider. This would give the reel the flattened elliptical profile shown in FIG. 3. With this arrangement the tines would move downwardly into the material in front of the cutterbar and then rearwardly over the sickle bar and laterally to the conditioning rolls. With the FIG. 3 embodiment of the reel, the laterally outermost part of the reel would lie directly over the right end of the sickle bar. There would be no tendency for the reel to project laterally beyond the sickle bar into the uncut material as occurs to a small degree in the FIG. 1 embodiment. However, some of the previously mentioned advantages associated with the FIG. 1 reel embodiment exist to a lesser degree in the FIG. 3 embodiment. Obviously, reel orientation between the two extreme limits indicated by the embodiments of FIGS. 1, 2 and 3 are possible and exhibit combined characteristics of both embodiments.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the the invention pertains, and as fall within the scope of the invention or the limits of the appended claims.

Having thus described my invention, what I claim is:

1. An agricultural machine comprising the combination of a mobile frame adapted to travel over the ground in a forward operative direction, a reciprocable sickle bar of predetermined length carried by said frame adjacent the ground and extending transverse to said direction of frame travel to mow a swath of crop material, a pair of coacting crop conditioning rolls journalled on said frame behind said sickle bar and extending parallel thereto, each of said rolls being substantially the same length as said sickle bar, said rolls being laterally displaced a predetermined distance relative to said sickle bar, and a reel journalled on said frame above said sickle bar, said reel having crop sweeping members movable downwardly into crop material in front of said sickle bar and then simultaneously laterally and rearwardly over said sickle bar to sweep the entire swath of crop material laterally and rearwardly to said conditioning rolls.

2. An agricultural machine comprising the combination of a mobile frame adapted to travel over the ground in a forward operative direction, a reciprocable sickle bar of predetermined length carried by said frame adjacent the ground and extending transverse to said direction of frame travel to mow a swath of crop material, a sickle bar gauging and supporting wheel journalled on said frame at one side thereof and disposed immediately behind one end of said sickle bar, a pair of co-acting crop conditioning rolls journalled on said frame behind and parallel to said sickle bar and beside said wheel whereby said rolls are laterally displaced relative to said sickle bar by the distance required to accommodate said wheel, each of said rolls being substantially the same length as said sickle bar, and a reel journalled on said frame above said sickle bar, said reel having crop sweeping members movable downwardly into crop material in front of said sickle bar and then simultaneously laterally and rearwardly over said sickle bar to sweep the entire swath of crop material laterally and rearwardly to said conditioning rolls and away from said wheel.

3. An agricultural machine comprising the combination of a mobile frame adapted to travel over the ground in a forward operative direction, a reciprocable sickle bar of predetermined length carried by said frame adjacent the ground and extending transverse to said direction of frame travel to mow a swath of crop material, a sickle bar gauging and supporting wheel journalled on said frame at one side thereof and disposed immediately behind one end of said sickle bar, a pair of coacting crop conditioning rolls journalled on said frame behind and parallel to said sickle bar and beside said wheel whereby said rolls are laterally displaced relative to said sickle bar by the distance required to accommodate said wheel, each of said rolls being the same length as said sickle bar, a reel carried by said frame above said sickle bar, said reel having left and right end members, a plurality of bars extending between said end members parallel to said sickle bar, said bars each having one end journalled on said left end member and the other end journalled on said right end member, means journalling said left and right end members on said frame for rotation about separate parallel axes extending at angles between parallel and perpendicular to said sickle bar, and means rotating said reel end members about said axes in a direction to carry said bars downwardly into crop material in front of said sickle bar and then laterally and rearwardly over said sickle bar toward said conditioning rolls to sweep the entire swath of crop material laterally and rearwardly to said conditioning rolls and away from said wheel.

4. An agricultural machine as recited in claim 3 wherein a plurality of crop material raking tines are carried by each of said reel bars.

5. An agricultural machine as recited in claim 3 wherein said separate parallel axes of rotation of said reel end members lie in a common horizontal plane.

6. An agricultural machine as recited in claim 3 wherein said separate parallel axes of rotation of said reel end members lie in a common vertical plane.

7. An agricultural machine comprising the combination of a mobile frame adapted to travel over the ground in a forward operative direction, a reciprocable sickle bar carried by said frame and extending transverse to said direction of travel to mow crop material, a reel carried by said frame above said sickle bar, said reel having left and right end members, a plurality of bars extending between said end members parallel to said sickle bar, said bars each having one end journalled on said left end member and the other end journalled on said right end member, means journalling said left and right end members on said frame for rotation about separate parallel axes extending at angles between parallel and perpendicular to said sickle bar, and means rotating said reel and members about said axes in a direction to carry said bars downwardly into crop material in front of said sickle bar and then laterally and rearwardly over said sickle bar.

References Cited

UNITED STATES PATENTS

| | | | |
|---|---|---|---|
| 2,077,018 | 4/1937 | Schewe | 56—220 |
| 2,484,981 | 10/1949 | Coultas | 56—23 X |
| 3,241,300 | 3/1966 | Fell et al. | 56—1 |

ABRAHAM G. STONE, *Primary Examiner.*

ANTONIO F. GUIDA, *Examiner.*